United States Patent
Crisp et al.

(10) Patent No.: US 9,926,902 B2
(45) Date of Patent: Mar. 27, 2018

(54) OPTIMIZING THE AUTOMATIC ENGINE START/STOP MECHANISM FOR DRIVING OPERATION

(71) Applicant: FORD GLOBAL TECHNOLOGIES, LLC, Dearborn, MI (US)

(72) Inventors: Nicholas Dashwood Crisp, Benfleet (GB); Rainer Busch, Aachen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 15/293,727

(22) Filed: Oct. 14, 2016

(65) Prior Publication Data

US 2017/0107964 A1    Apr. 20, 2017

(30) Foreign Application Priority Data

Oct. 14, 2015   (DE) .................... 10 2015 219 902

(51) Int. Cl.
| | | |
|---|---|---|
| *F02N 11/08* | (2006.01) | |
| *F16H 63/50* | (2006.01) | |
| *F16H 59/42* | (2006.01) | |

(52) U.S. Cl.
CPC ...... *F02N 11/0833* (2013.01); *F02N 11/0822* (2013.01); *F16H 63/50* (2013.01); *B60Y 2300/18016* (2013.01); *F02N 2200/0801* (2013.01); *F02N 2200/0802* (2013.01); *F02N 2200/101* (2013.01); *F02N 2200/102* (2013.01); *F02N 2200/103* (2013.01);
(Continued)

(58) Field of Classification Search
CPC .. F02N 11/08; F02N 11/0833; F02N 11/0822; F02N 2200/0801; F02N 2200/102; F02N 2300/2011; F02N 2200/103; F16H 63/50; F16H 59/42; F16H 2312/14
See application file for complete search history.

(56) References Cited

U.S. PATENT DOCUMENTS

| | | | |
|---|---|---|---|
| 6,176,807 B1* | 1/2001 | Oba ..................... | B60K 6/365 180/65.25 |
| 8,388,494 B2* | 3/2013 | Schiele ................. | B60K 6/48 477/101 |
| 9,758,151 B2* | 9/2017 | Kato .................... | B60W 20/10 |

FOREIGN PATENT DOCUMENTS

DE    102012216098 A1    3/2013

OTHER PUBLICATIONS

German Examination Report for German Application No. 10 2015 219 902.9 dated Jun. 21, 2016.

* cited by examiner

*Primary Examiner* — Hieu T Vo
(74) *Attorney, Agent, or Firm* — David Kelley; Brooks Kushman P.C.

(57) ABSTRACT

A system and method for starting/stopping an engine in a moving vehicle include stopping the engine, by a controller, in response to a time needed to start the engine from a stopped state and attain an engine speed corresponding to a driveshaft speed when stopping the engine being less than a target time, and starting the engine in response to the time needed reaching the target time. A start/stop vehicle having an engine includes a driveshaft speed sensor and a controller configured to stop the engine while the vehicle is moving with a vehicle speed below a threshold speed in response to a time associated with starting the engine and powering a driveshaft to attain a driveshaft speed measured by the driveshaft speed sensor and stored from a previous engine stopping event being less than a threshold time.

20 Claims, 3 Drawing Sheets

(52) U.S. Cl.
CPC ...... *F02N 2300/2011* (2013.01); *F16H 59/42* (2013.01); *F16H 2312/14* (2013.01)

OPTIMIZING THE AUTOMATIC ENGINE START/STOP MECHANISM FOR DRIVING OPERATION

CROSS-REFERENCE TO RELATED APPLICATIONS

This application claims foreign priority benefits under 35 U.S.C. § 119(a)-(d) to DE 10 2015 219 902.9 filed Oct. 14, 2015, which is hereby incorporated by reference in its entirety.

TECHNICAL FIELD

This disclosure relates to a system and device for starting and stopping an internal combustion engine of a motor vehicle in driving operation with positive velocity in a travel direction of the motor vehicle. The invention additionally relates to a device for starting and stopping the internal combustion engine of the motor vehicle, and to the motor vehicle having the device for starting and stopping the internal combustion engine.

BACKGROUND

With increasing environmental demands and gasoline prices, vehicle economy and ecology, in particular saving fuel and reducing the exhaust gas emissions, is increasingly entering the focal point of politics, public awareness, automobile producers, and the customers thereof. Stricter and stricter exhaust gas standards are being enacted and are to be fulfilled.

To reduce a fuel consumption of a motor vehicle, stopping the engine of the motor vehicle, for example, in longer stationary phases, for example, in a traffic jam, in congested traffic, or at a traffic signal, and only starting it again upon an engine power request of the driver, is known. However, further measures are needed for reducing the fuel consumption and the exhaust gas emissions.

SUMMARY

In at least one embodiment, a method for starting/stopping an engine in a moving vehicle includes stopping the engine, by a controller, in response to a time needed to start the engine from a stopped state and attain an engine speed corresponding to a driveshaft speed when stopping the engine being less than a target time, and starting the engine in response to the time needed reaching the target time.

One or more embodiments may include a start/stop vehicle having an engine including a driveshaft speed sensor and a controller configured to stop the engine while the vehicle is moving with a vehicle speed below a threshold speed in response to a time associated with starting the engine and powering a driveshaft to attain a driveshaft speed measured by the driveshaft speed sensor and stored from a previous engine stopping event being less than a threshold time.

A method for starting and stopping an internal combustion engine of a motor vehicle in driving operation with positive velocity in a travel direction of the motor vehicle comprises determination of a velocity of a driveshaft of a transmission of the motor vehicle, determination of a time span, wherein the time span is required to actuate the internal combustion engine from a stopped state as a result of an engine power request such that a speed of an engine shaft of the internal combustion engine, which is coupled to the drive shaft, reaches the velocity of the driveshaft of the transmission, comparison of the time span to a target time span for providing an engine power, and stopping of the internal combustion engine if the time span is less than the target time span.

The method enables, in driving operation with positive velocity, for example, in a forward-oriented main travel direction of the motor vehicle, stopping the internal combustion engine under given circumstances and putting it back into gear later. The goal is to only stop the internal combustion engine when, upon the engine power request, starting of the internal combustion engine and provision of a drive power can be provided at short notice, and specifically in a time span acceptable to the driver.

The time span acceptable for the driver is specified as the target time span in the method and can be predefined as a fixed variable or can depend on various circumstances, for example, on a driving style of the driver, on a velocity of the vehicle, or on a traffic situation. In particular, it is conceivable to permit a longer target time span, for example, when driving at low velocities in congested traffic, while a short target time span guarantees rapid vehicle reactions in city traffic with overtaking procedures.

The engine can be any arbitrary drive assembly, for example, a gasoline engine or diesel engine.

The velocity of the driveshaft of the transmission can be measured, estimated, or calculated, for example, in the method. It can be specified in revolutions per minute (RPM). In particular, the velocity of the driveshaft is to be understood as the present, current velocity of the driveshaft, which is decisive for the current status of the motor vehicle and in particular is the presently available engine speed essentially in the moment in which the method is carried out. In particular, the method is based on the consideration that this engine speed is given up by the possible stopping of the internal combustion engine and is to be reestablished as rapidly as possible after renewed starting.

The time span required for this purpose is determined, calculated, and/or estimated in the method. In the case of determination of the time span, it is presumed that the internal combustion engine is in a stopped state, in which the engine shaft has a speed of 0 RPM or in any case a very low speed. It is presumed in this case that, in this stopped state, an engine power request of a driver or an autopilot or cruise control, for example, occurs, wherein a specific engine power is to be provided in the shortest possible time in accordance with the engine power request.

Since a possibly requested engine power is possibly not known at the time of carrying out the method, the velocity of the driveshaft of the transmission existing at the moment of carrying out the method is presumed as the request variable. This ensures uniform driving operation even over possible stopping of the internal combustion engine.

In the method step of the determination of the time span, the time span is therefore determined so that, proceeding from a stopped state of the engine, the presently existing velocity of the driveshaft of the transmission is to be reached. The time span required for this purpose is determined in the method step, for example, on the basis of characteristic variables of the vehicle.

In particular, experimental series can be carried out for a specific vehicle type, from which the required time span is to be inferred and the results of which are stored, for example, in correlation tables. These correlation tables can be used in the method for determining the time span.

In the step of comparing the time span to the target time span, it can therefore be determined whether, after stopping of the internal combustion engine, the required engine power can be provided within the acceptable time span. This is the case if the time span is less than the target time span.

Accordingly, the internal combustion engine is only stopped according to the method if the time span is less than the target time span, thus if it is ensured that the requested engine power and/or the presently existing velocity of the driveshaft of the transmission can be provided within the time span acceptable for the driver.

Stopping of the internal combustion engine is therefore avoided if the time span is longer than the target time span, thus if a delay which is to be clearly noticed by the driver, is a concern in the power provision of the internal combustion engine.

Stopping of the internal combustion engine is therefore also enabled during travel, and specifically even if a gear is engaged, a clutch pedal is not pressed, and a clutch between the internal combustion engine and the transmission is closed. The stopping is only carried out if it does not result in a delay, which is possibly not acceptable to the driver, in the provision of the requested engine power. Accordingly, a rapid system reaction of the motor vehicle is also ensured in the case of stopping during travel, and an unacceptable delay of the engine power provision is avoided.

The velocity of the driveshaft of the transmission is dependent on conditions of the driving operation. In particular, the velocity of the driveshaft of the transmission is always comparatively high if the motor vehicle is moved in a low gear at high velocity. In these cases, a longer time span is determined by the method, since the engine shaft, in the case of an engine power request, is in the most unfavorable case to be accelerated from a standstill to the comparatively high speed. In these cases, the comparison of the time span to the target time span will frequently turn out to the disadvantage of the engine stop. In the case of such a driving style, stopping of the internal combustion engine is therefore indicated more rarely than in the case of a driving style in a higher gear at lower velocity.

In one embodiment, the method comprises starting of the internal combustion engine if the time span is greater than the target time span and the internal combustion engine is in the stopped state.

For example, it is possible that the internal combustion engine was stopped as a result of an earlier decision of the method or as a result of an operating action of the driver or a system request. If it is now established in the method that the time span for providing the engine power is greater than the (acceptable) target time span with regard to a present driving situation and/or with regard to the specific existing velocity of the driveshaft of the transmission, the internal combustion engine is thus also started without the existence of the engine power request. In this way, even after stopping of the internal combustion engine caused by the system or in another manner, the method always triggers starting of the internal combustion engine if it appears necessary with regard to possible engine power requests of the driver to be expected, to avoid a possible delay, which diminishes the acceptance of the driver, in the provision of the engine power.

In a further embodiment, the determination of the velocity of the driveshaft of the transmission comprises determination of an engaged gear of a gear shift of the motor vehicle, determination of a velocity of the motor vehicle, and/or determination of the velocity of the driveshaft of the transmission on the basis of the engaged gear and the velocity of the motor vehicle.

In particular, the velocity of the driveshaft of the transmission can be derived from the vehicle velocity, if the engaged gear is known and characteristic data of the transmission are provided.

For example, the engaged gear can be determined by means of a gear sensor, which can acquire, for example, a position, a movement, or an acceleration of a gear selection lever.

Furthermore, it is possible to recognize the engaged gear with the aid of a gear lever parity sensor, wherein the gear lever parity sensor signals if a shift was made from an even gear into an odd gear and/or from an odd gear into an even gear. Together with an analysis of a vehicle velocity change, upshifting or downshifting of the gear and therefore in most cases the engaged gear can be concluded therefrom.

However, the recognition of the shift from an odd gear into an odd gear or from an even gear into an even gear is problematic in the observation of signals of the gear lever parity sensor. This can be recognized by means of a neutral sensor of the gear shift, which recognizes a neutral position of the gear selection lever.

By means of the neutral sensor, a change of the selected gear can also be concluded in many cases with respect to a velocity change.

If the selected gear is known, the velocity of the driveshaft of the transmission can be determined on the basis of the vehicle velocity. In this case, characteristic variables of the design of the transmission, in particular the size and gear teeth of the gearwheels, and also a tire size can be taken into consideration as further influencing variables.

The velocity of the driveshaft of the transmission and the time span can thus be determined with high precision.

In one variant of this method, the determination of the engaged gear can comprise determination of whether, since a previous determination of the engaged gear, the neutral sensor of the gear shift has indicated the neutral position of the gear selection lever of the gear shift.

If this is not the case, a previously determined gear can be presumed or assumed to be the presently engaged gear. This simplifies the determination of the engaged gear and therefore the determination of the velocity of the driveshaft. In particular, a re-determination of the engaged gear is only necessary if it is triggered by a signal of the neutral sensor, i.e., if it is signaled that the gear shift was actuated. In this way, the determination of the velocity of the driveshaft is simplified and computing time is saved.

In a further embodiment, the velocity of the driveshaft of the transmission is determined, i.e., in particular calculated or estimated, on the basis of a circumference of clutch wheels and gear teeth of the clutch wheels.

In particular, the speed of the driveshaft of the transmission can be determined very accurately on the basis of the velocity of the vehicle and the characteristic data of the clutch wheels, since the gear teeth of the clutch wheels determine the transmission ratio of the engine speed in the transmission via the drive train. A variable of the wheels of the motor vehicle can be used as a further input variable.

For the above-mentioned method for the determination of the velocity of the driveshaft, it is to be taken into consideration that it can be carried out without additional hardware components, so that a device for carrying out the method can be designed particularly cost-effectively.

In a further variant, the determination of the velocity of the driveshaft of the transmission is performed on the basis of an output signal of a rotational velocity sensor, which is arranged on the driveshaft of the transmission.

In particular, the rotational velocity sensor can be arranged directly on the driveshaft, to achieve determination of the velocity of the driveshaft simply, rapidly, and with high precision.

In a further embodiment, the engine power request is based on a signal or a combination of signals from a group comprising a release signal of a clutch, an actuation signal of an accelerator pedal, an actuation signal of a gear shift, and a release signal of a brake pedal.

In particular, the driver generally intends, by releasing the clutch, to close the drive train and therefore transmit an engine power to the driven wheels of the motor vehicle. However, if the engine is in the stopped state, no power is provided. It is therefore necessary upon releasing the clutch to put the engine into operation within the target time span such that the engine shaft rotates with the requested speed and/or the requested drive torque.

An engine power corresponding to the status of the accelerator pedal is also to be provided within the target time span upon an actuation signal of the accelerator pedal, and independently of whether the engine is in a stopped or started state.

This also applies even if the driver actuates the gear shift such that he selects a gear.

If he selects a higher gear, it can thus be decided according to the method depending on the selected gear whether the engine is to be started and the engine power is to be provided, or whether starting of the internal combustion engine is not yet indicated, for example, with regard to a clutch which is not yet released.

If he selects a lower gear at a given, for example, higher vehicle velocity, this can indicate an intention of the driver to slow the travel, on the one hand, or the desire to accelerate forcefully as soon as possible, on the other hand. A decision as to whether the engine is to be stopped in this state or whether the engine is to be restarted in the stopped state can be made according to the method. It is taken into consideration in this case that in the low gear, after an engine stop, the provision of a high velocity of the engine shaft and/or driveshaft of the transmission would be required. According to the method, in this situation a higher required time span was determined for startup. The comparison of the higher time span to the target time span then supplies a decision criterion, which assists an economical driving style, on the one hand, and ensures that a required engine power is provided in a timely manner, on the other hand.

In a further variant, the method comprises determination of a classification signal on the basis of a torque of the engine shaft in a moment of a predefined acceleration. Furthermore, the method comprises determination of a velocity threshold value for an engine stop on the basis of the classification signal. In this case, stopping of the engine is prevented if a velocity of the motor vehicle exceeds the velocity threshold value.

In particular, at the moment of the predefined acceleration, on the basis of the torque of the engine shaft, a total pull weight of the vehicle and therefore a vehicle class can be concluded, which determines the classification signal. The velocity threshold value for the engine stop can then be determined depending on the vehicle class and/or the classification signal.

In the case of large, heavy motor vehicles, stopping of the engine during travel can thus be carried out only at comparatively low velocities, so that undesired delays in the acceleration are avoided. At the same time, in the case of small and light vehicles, the engine can also be stopped at comparatively higher velocities, if the requested engine power can be provided within the target time span.

The determination of the classification signal, i.e., for example, of the vehicle type, therefore enables stopping of the engine to be excluded already on the basis of the present velocity, whereby carrying out the method for starting and stopping the internal combustion engine is made substantially easier and computing time is saved.

In a further embodiment, the method comprises stopping of the internal combustion engine if a velocity of the motor vehicle decreases and the gear shift is in a neutral position. Alternatively or additionally, the method comprises stopping of the internal combustion engine if a velocity of the motor vehicle decreases and a brake request is provided. In this case, the brake request can be triggered, for example, by the driver via the brake pedal or also by an electronic braking system or autopilot.

In particular, it can indicate stopping of the internal combustion engine if the velocity of the vehicle decreases. If the driver additionally moves the gear shift into the neutral position or requests braking, it can be presumed that the driver wishes to further slow the travel and will not request engine power immediately, i.e., that stopping is particularly indicated. Furthermore, it is not possible to reclaim energy from the reduced velocity while the gear shift is in the neutral position. Stopping the engine to save further energy is therefore reasonable in this case.

In a further variant, the method comprises determination of a gear to be recommended such that, at an existing velocity of the motor vehicle, a velocity of the driveshaft of the transmission is as low as possible. Furthermore, the method comprises signaling of the gear to be recommended to the driver of the motor vehicle.

A driving behavior of the driver can be influenced by the recommendation of a gear. In particular, the driver can be required to select the gear so that the engine is operated at low speed and therefore the velocity of the driveshaft of the transmission is rather low and/or is as low as possible and is as close as possible to the idle speed of the engine.

This has an effect on the method so that the resulting time span for starting up the internal combustion engine again is comparatively short. Therefore, with such a driving profile, frequent stopping of the internal combustion engine during travel can be achieved. The driver is therefore motivated by the recommendation of the gear to be selected toward an energy-saving and emission-reducing driving style, which further promotes the energy savings by the start-stop operation.

A device for starting and stopping the internal combustion engine of the motor vehicle in driving operation with positive velocity in the travel direction comprises a shaft velocity determination unit, wherein the shaft velocity determination unit is configured to determine a velocity of a driveshaft of a transmission of the motor vehicle. Furthermore, the device comprises a determination unit, wherein the determination unit is configured to determine the time span, wherein the time span is required to actuate the internal combustion engine from the stopped state as a result of the engine power request such that the speed of the engine shaft of the internal combustion engine reaches the determined velocity of the driveshaft of the transmission. Furthermore, the device comprises a comparison unit, wherein the comparison unit is configured to compare the time span to the target time span for providing the engine power. In addition, the device comprises a stop unit, wherein the stop unit is configured to stop the internal combustion engine if the time span is less than the target time span. The shaft velocity determination unit, the determination unit, the comparison unit, and the stop unit can each comprise microprocessors and can be implemented in control units.

The device for starting and stopping the internal combustion engine is therefore designed for carrying out the method having the mentioned features in the motor vehicle. For example, it can be integrated in one control unit or also be distributed onto multiple control units. In particular, the device can be integrated in the scope of an automatic engine start/stop mechanism of an engine controller and can act directly therefrom on the internal combustion engine.

In particular, in one embodiment the device can comprise a start unit, wherein the start unit is configured to start the internal combustion engine if the internal combustion engine is in the stopped state and the time span is greater than the target time span.

In this embodiment, the device can also start the engine with regard to an engine power request to be expected, if this appears necessary, to prevent long delays of the power provision.

A motor vehicle comprises an internal combustion engine having an engine shaft driven by the internal combustion engine, a transmission having a driveshaft, wherein the driveshaft is coupled to the engine shaft, and a device for starting and stopping the internal combustion engine having the above-mentioned features.

The motor vehicle can furthermore comprise a start device for starting the internal combustion engine and/or an electric motor of the start device, wherein the electric motor is configured to generate a drive torque, and wherein the engine shaft can be accelerated by the drive torque to a predetermined speed, wherein the predetermined speed corresponds to an idle speed of the internal combustion engine or is greater than the idle speed.

The start device can therefore comprise an electric motor, which accelerates the engine shaft such that it provides the requested engine power in the shortest possible time from the stopped state in the shortest possible time upon a request for engine power. This can be provided by the hybrid electric motor in a motor vehicle having hybrid drive, for example. A motor vehicle having hybrid drive is accordingly particularly suitable for implementing the automatic engine start/stop mechanism.

The device for starting and stopping enables the mentioned method to be carried out in operation of the motor vehicle and therefore stopping of the internal combustion engine to be enabled as frequently as possible, wherein, at the same time, early starting and timely provision of engine power upon a request of the driver is ensured.

The above-described properties, features, and advantages of the invention and the manner in which they are achieved will become clear and clearly comprehensible in conjunction with the following description of the exemplary embodiments, which are explained in greater detail in conjunction with the drawings. In the figures:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the claimed subject matter based on the representative embodiments described.

Figure 1:
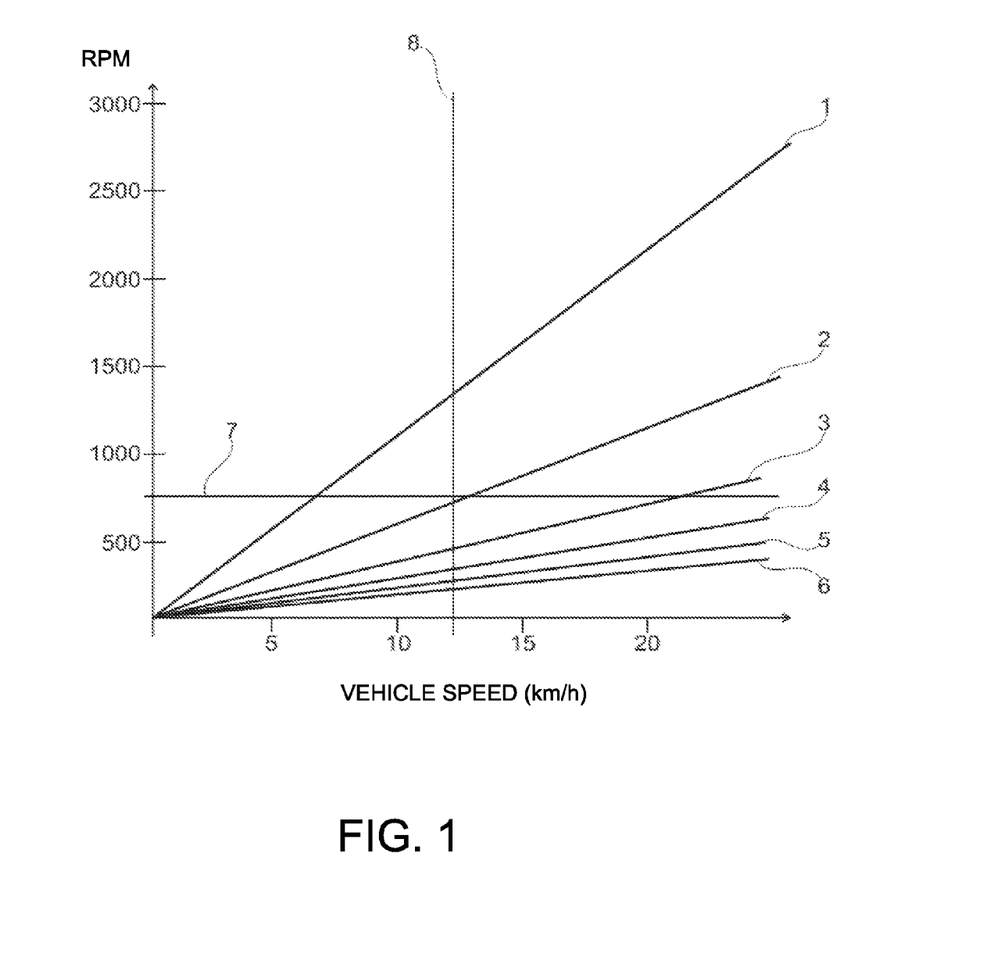
FIG. 1 shows a diagram, in which a velocity of the driveshaft of the transmission and/or an engine speed is indicated as a function of a vehicle velocity.

FIG. 1 shows a diagram in which an engine speed and/or a velocity of a driveshaft of a transmission of a motor vehicle is shown as a function of a vehicle velocity of the motor vehicle. In particular, the vehicle velocity is indicated in km/h on the abscissa, and the rotational velocity of the driveshaft is indicated in revolutions per minute (RPM) on the ordinate. The straight line 1 indicates in this case the velocity of the driveshaft as a function of the vehicle velocity in a first gear, the straight line 2 indicates the corresponding velocity in a second gear, the straight line 3 in a third gear, the straight line 4 in a fourth gear, the straight line 5 in a fifth gear, and the straight line 6 in a sixth gear. It is clear that at a given velocity, the speed of the driveshaft of the transmission significantly increases with the selection of a lower gear, and in particular high speeds of the driveshaft are provided in first gear.

An idle speed of the engine is marked in the diagram by the straight line 7. It is clear that at low velocities in normally used gears 2 to 6, low speeds below the idle speed are provided. In this case, there is no possibility for reclaiming energy during the braking procedure. At engine speeds below the idle speed, stopping of the engine to save energy can therefore be indicated in particular.

However, it is to be considered in this case that stopping of the engine is only to be carried out if the time span which is required to actuate the engine from a stopped state as a result of an engine power request, for example, such that the speed of the engine shaft of the engine reaches the velocity of the driveshaft of the transmission, does not exceed a target time span for the provision of the engine power. It can only thus be ensured that undesired delays in the provision of the engine power are avoided.

For example, if the internal combustion engine is stopped during travel in second gear with the velocity threshold identified by the straight line 8, it can thus be reasonable if the driver desires further slowing of the travel. However, if he shifts into first gear to accelerate the travel, a significantly higher speed of the driveshaft of the transmission and/or engine speed will be required at short notice. If the engine was already stopped, a delay can occur during the provision of the corresponding engine power.

It is therefore necessary to only stop the internal combustion engine if the provision of the requested engine power is possible within a target time span acceptable to the driver.

Figure 2:
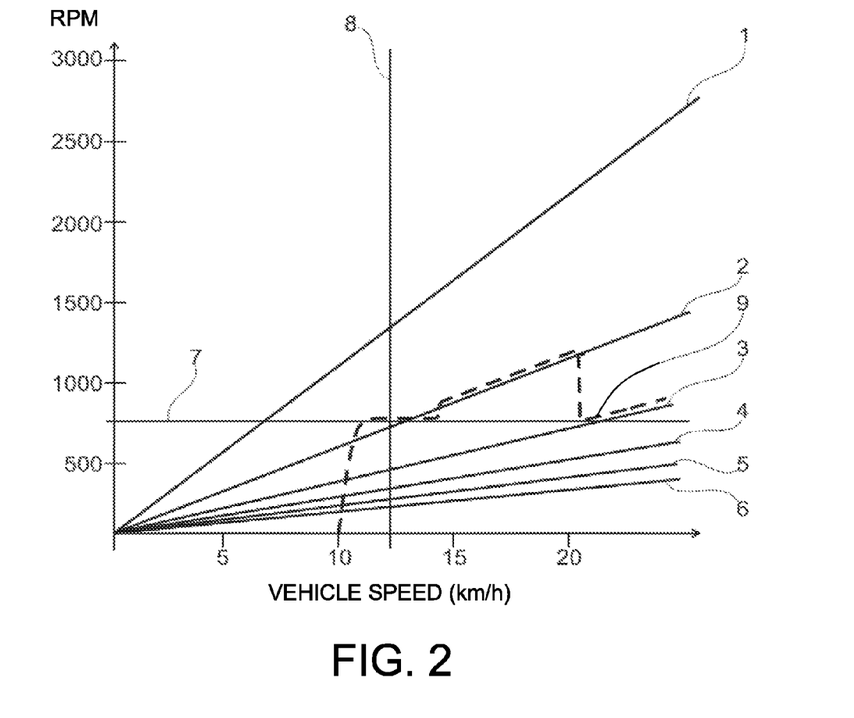
FIG. 2 shows the diagram in FIG. 1, in which a driving procedure with reduction of the velocity and change of the selected gear with a stop of the internal combustion engine is incorporated.

FIG. 2 shows the diagram from FIG. 1, in which the driving procedure 9 is supplemented. In the driving procedure 9, the driver reduces his velocity in third gear and then shifts into second gear, confirming his intention to slow down. As soon as the engine speed and/or the velocity of the driveshaft enters the region of the idle speed identified by the line 7 during this driving procedure 9, it is reasonable to stop the internal combustion engine. However, it is to be ensured in this case that the required engine power is provided within an acceptable time to the driver upon an engine power request, in particular thus that the engine starts within the acceptable time span and can be accelerated to the requested speed.

Figure 3:
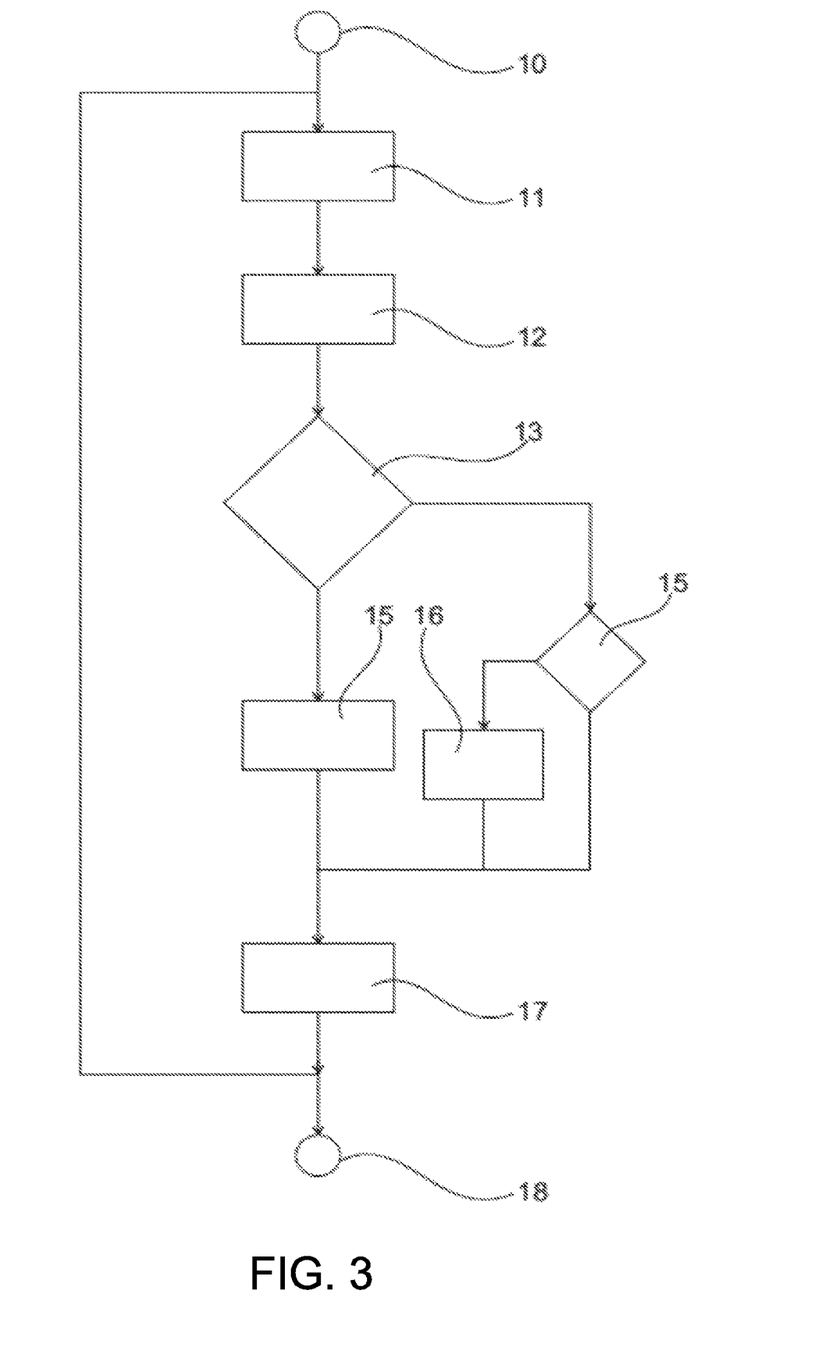
FIG. 3 shows a method for starting and stopping an internal combustion engine of a motor vehicle in driving operation with positive velocity.

This can be achieved with the method shown in FIG. 3, which begins, for example, with the starting of a driving operation at 10. At 11, the velocity of the driveshaft of the transmission is determined, for example, estimated or calculated as described above. At 12, the time span is determined, which is required to actuate the internal combustion engine from a stopped state as a result of an engine power request, for example, by releasing the clutch, actuating the accelerator pedal, or actuating a gear shift, such that the speed of the engine shaft of the internal combustion engine reaches the velocity of the driveshaft of the transmission. At 13, the time span is compared to a target time span which would in particular still be acceptable to a driver of the motor vehicle for providing the engine power. If the time span is less than the target time span, the internal combustion engine is thus stopped or remains stopped at 14. However, if the time span is greater than the target time span, it is thus checked at 15 whether the engine is already in the stopped state. In this case, the internal combustion engine is started at 16. At 17, a gear to be recommended can optionally be determined such that at the existing velocity of the vehicle, a velocity of the driveshaft of the transmission is as low as possible, for example, in the vicinity of the idle speed. The gear to be recommended can then be signaled to the driver of the motor vehicle.

By way of the repetition of steps 11 to 17 in further driving operation, the possibility exists of monitoring and regulating the engine operation such that fuel is saved and exhaust gas emissions are reduced by stopping the internal combustion engine whenever this does not noticeably delay the provision of the engine power. This method can be carried out until the driving operation ends at 18.

In this way, an engine stop can also be enabled at higher velocities of the vehicle and the automatic engine start/stop mechanism can effectively assist fuel-saving and emission-reducing driving behavior.

In this case, it can be ensured by the determination and comparison of the time span that delays which are not acceptable to the driver are avoided in the reaction of the motor vehicle to power requests.

The automatic engine start/stop mechanism can thus be used to assist economically and ecologically reasonable driving behavior with only very few additional hardware components or even without additional hardware.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly described or illustrated.

What is claimed is:

1. A start/stop vehicle having an engine, comprising:
   a driveshaft speed sensor; and
   a controller configured to stop the engine while the vehicle is moving with a vehicle speed below a threshold speed in response to a time associated with starting the engine and attaining an engine speed corresponding to a driveshaft speed measured by the driveshaft speed sensor and stored from a previous engine stopping event being less than a threshold time.

2. The vehicle of claim 1 further comprising a starter motor, wherein the controller is further configured to operate the starter motor to start the engine if the engine is in a stopped state and the time associated with starting the engine and powering the driveshaft to attain the driveshaft speed reaches the threshold time.

3. The vehicle of claim 1 further comprising a transmission, the controller further configured to determine the time associated with starting the engine and powering the driveshaft based on a transmission gear when the engine was stopped and a current transmission gear.

4. The vehicle of claim 1 wherein the controller is further configured to start the engine in response to receiving one or more signals associated with: a clutch release, actuation of an accelerator pedal, or a brake pedal release.

5. The vehicle of claim 1 wherein the controller is further configured to stop the engine in response to detecting a gear shift to a lower gear while vehicle speed is decreasing.

6. The vehicle of claim 1 wherein the controller is further configured to signal a recommended gear based on current vehicle speed to minimize the driveshaft speed.

7. A method for starting/stopping an engine in a moving vehicle, comprising:
   stopping the engine, by a controller, in response to
   a time needed to start the engine from a stopped state and attain an engine speed corresponding to a driveshaft speed when stopping the engine being less than a target time; and
   starting the engine in response to the time needed reaching the target time.

8. The method of claim 7 wherein the time needed increases with increasing driveshaft speed.

9. The method of claim 8 further comprising determining the time needed to start the engine from a stopped state and attain an engine speed corresponding to a driveshaft speed when stopping the engine based on a currently engaged gear of a vehicle transmission and current velocity of the vehicle.

10. The method of claim 7 further comprising:
    detecting a transmission neutral position to indicate a gear shift after stopping the engine.

11. The method of claim 7 further comprising:
    detecting a gear shift in response to a transmission gear lever parity check between a gear selected upon stopping the engine and a current gear.

12. The method of claim 7 further comprising accessing a stored relationship between driveshaft speed and vehicle speed to determine the engine speed to attain the driveshaft speed after starting the engine based on the vehicle speed and a currently selected gear.

13. The method of claim 7 further comprising starting the engine in response to receiving one or more signals associated with
    a clutch release,
    actuation of an accelerator pedal,
    actuation of a gear shift, or
    a brake pedal release.

14. The method of claim 7 further comprising:
    preventing stopping the engine in response to vehicle speed exceeding a corresponding threshold.

15. The method of claim 7 further comprising stopping the engine in response to decreasing vehicle speed and a gear shift being in a neutral position.

16. The method of claim 7 further comprising stopping the engine in response to a brake request while vehicle speed is decreasing.

17. The method of claim 7 further comprising signaling a recommended gear based on current vehicle speed to minimize the driveshaft speed.

18. A method for controlling an engine of a start/stop vehicle, comprising:
   while the vehicle is moving below a speed threshold, when a time for starting the engine and reaching an engine speed corresponding to a current driveshaft speed is less than a time threshold, storing the current driveshaft speed and stopping the engine; and
   starting the engine and attaining the engine speed corresponding to the stored driveshaft speed in response to a driver power demand.

19. The method of claim 18 wherein the driver power demand corresponds to at least one signal indicative of a brake pedal release, an accelerator pedal actuation, or a clutch pedal release.

20. The method of claim 18 further comprising determining the engine speed based on a currently selected gear different from a gear selected when stopping the engine.

* * * * *